United States Patent
Morozini De Lira

(10) Patent No.: US 10,620,001 B2
(45) Date of Patent: Apr. 14, 2020

(54) MEASURING DEVICE FOR A SIDE IMPACT TEST

(71) Applicant: Dr. Ing. h.c.F. Porsche Aktiengesellschaft, Stuttgart (DE)

(72) Inventor: Adriano Morozini De Lira, Stuttgart-Vaihingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 192 days.

(21) Appl. No.: 15/943,182

(22) Filed: Apr. 2, 2018

(65) Prior Publication Data

US 2018/0283857 A1 Oct. 4, 2018

(30) Foreign Application Priority Data

Apr. 3, 2017 (DE) .................. 10 2017 107 138

(51) Int. Cl.
| | | |
|---|---|---|
| *G01B 13/12* | (2006.01) | |
| *G01M 17/007* | (2006.01) | |
| *G01B 5/00* | (2006.01) | |
| *G01B 5/14* | (2006.01) | |

(52) U.S. Cl.
CPC ........... *G01B 13/12* (2013.01); *G01B 5/0025* (2013.01); *G01B 5/14* (2013.01); *G01M 17/0078* (2013.01)

(58) Field of Classification Search
CPC ............................... G01B 13/02; G01B 13/04
USPC ........................................... 33/832, 833, 837
See application file for complete search history.

(56) References Cited

U.S. PATENT DOCUMENTS

| | | | | |
|---|---|---|---|---|
| 4,110,611 A | * | 8/1978 | Tann ...................... | G01D 5/252 250/237 R |
| 4,186,491 A | | 2/1980 | Shawke | |
| 4,455,757 A | * | 6/1984 | Schwartz ................. | G01B 5/25 164/154.2 |
| 5,755,135 A | * | 5/1998 | Strobel .................. | D01G 23/06 73/159 |
| 9,903,702 B2 | | 2/2018 | Verschut et al. | |
| 2005/0206910 A1 | * | 9/2005 | Schroeder .............. | G01B 7/001 356/614 |

FOREIGN PATENT DOCUMENTS

| | | |
|---|---|---|
| DE | 84739 | 9/1971 |
| DE | 102009010189 | 8/2010 |
| DE | 102016201574 | 8/2017 |

OTHER PUBLICATIONS

German Search Report dated Dec. 14, 2017.

* cited by examiner

*Primary Examiner* — George B Bennett
*Assistant Examiner* — G. Bradley Bennett
(74) *Attorney, Agent, or Firm* — Gerald E. Hespos; Michael J. Porco; Matthew T. Hespos

(57) ABSTRACT

A measuring device (10) for measuring the space remaining after a side crash has a pneumatic piston rod cylinder (20) with a cylinder (22), and a piston rod (24) that can move relative to the cylinder (22). A measuring unit (40) measures the movement (26) of the piston rod (24) relative to the cylinder (22), and a base part (12) positions the piston rod cylinder (20). The piston rod cylinder (20) can be connected to a pressure vessel (70) to permit the piston rod (24) to move out when a fluid is applied to the piston rod cylinder (20).

11 Claims, 3 Drawing Sheets

MEASURING DEVICE FOR A SIDE IMPACT TEST

CROSS REFERENCE TO RELATED APPLICATION

This application claims priority under 35 USC 119 to German Patent Appl. No. 10 2017 107 138.5 filed on Apr. 3, 2017, the entire disclosure of which is incorporated herein by reference.

BACKGROUND

Field of the Invention

The invention relates to a measuring device for measuring the space that remains for the vehicle occupants after a side impact.

Description of the Related Art

Side impact tests also are referred to as side crash tests. These tests intentionally subject a vehicle to a side impact and then perform an examination to determine the size of the survival space available to the vehicle occupants after the side impact. Occupant protection is the highest priority in a side impact, and the space remaining to the vehicle occupant after the side impact must be sufficient. The safety of the vehicle occupants plays a decisive role when developing vehicles for production.

The measurement of the space remaining after a side impact for the vehicle occupant or occupants should be reproducible, and the measuring device should be able to be used, as far as possible, for all, or for at least a majority of the vehicle series.

DE 10 2009 010 189 A1 discloses a measuring unit for determining the survival space in a motor vehicle after a side impact. The measuring unit comprises an outer cylindrical housing and an inner cylinder that is mounted in the housing. The inner cylinder can be moved partially out of the housing. The measuring unit has an electric drive for moving the cylinder relative to the housing, and a device for displaying the relative position of the housing and cylinder is provided.

U.S. Pat. No. 9,903,702 discloses a measuring unit with a telescopic extension arm that can be telescoped together along a longitudinal axis.

An object of the invention is to provide a new measuring device for measuring the space remaining after a side impact.

SUMMARY

The invention relates to a measuring device that can determine, in a satisfactorily reproducible fashion, a value for the remaining space. The invention uses a piston rod cylinder. A force can be applied to components of the motor vehicle and those components can be pressed to the side with the pressure prevailing in the pneumatic piston rod cylinder.

A pressure-reduction valve may be provided and may be configured to limit the pressure P in the piston rod cylinder to a predefined pressure P_s. As a result, the pressure and therefore the force acting on the vehicle parts can be limited so that it is possible to execute a test in a reproducible fashion.

The predefined pressure P_s may be adjustable. Thus, the pressure may be adjusted according to different biomechanical criteria.

Plates with a predefined area may be provided at each of the ends of the piston rod cylinder. The plates may be connected detachably to the piston rod cylinder so that the plates can be exchanged. As a result, the area with which the piston rod cylinder presses against the vehicle can be varied.

The measuring device may have a controllable valve that is designed to activate or deactivate the admission of a fluid to the piston rod cylinder.

A guide may be provided for permitting a linear movement of the base part relative to the cylinder. Thus, the piston rod cylinder can be positioned easily.

The measuring device may be a portable unit in which the base part, the piston rod cylinder and the pressure-reduction valve are connected to one another.

A pressure vessel may be assigned to the measuring device. As a result, the measuring device can be used autonomously and without a pressure connection that is connected permanently to the measuring device.

A detachable connection may be provided on the base part for connection to the pressure vessel. As a result, the pressure vessel can be exchanged easily and the measuring device can be used as one unit for the measurement.

Handles may be provided on the base part to facilitate handling of the measuring device and positioning the measuring device on a vehicle seat.

Further details and advantageous developments of the invention are apparent from the exemplary embodiments which are described below, illustrated in the drawings and are not to be understood in any way as a restriction of the invention.

DETAILED DESCRIPTION

Figure 1:
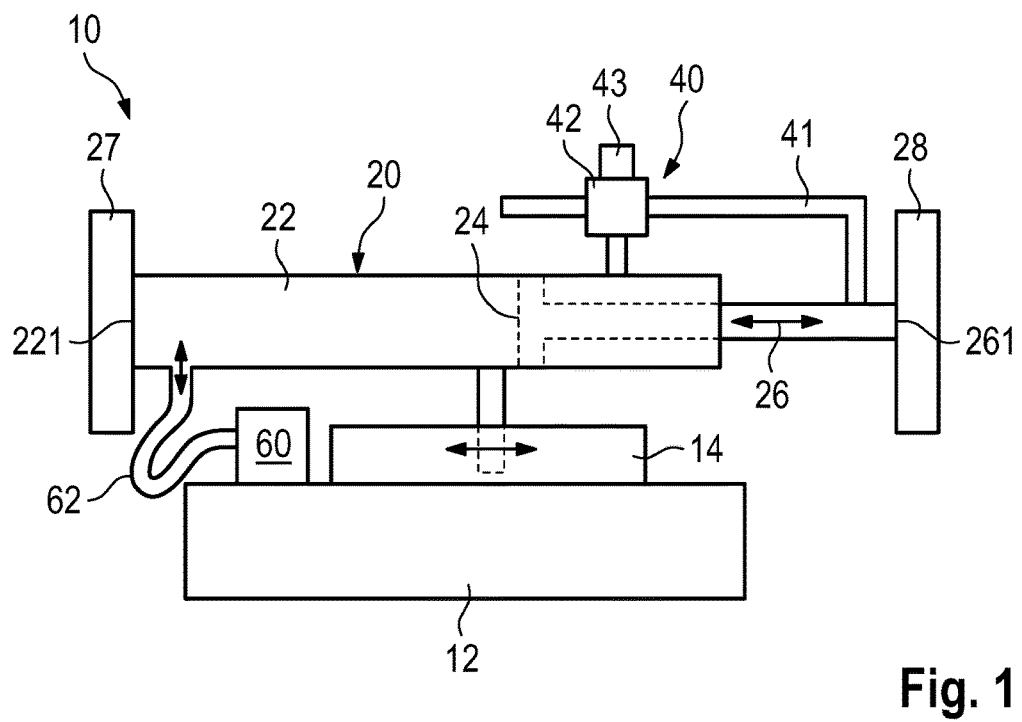
FIG. 1 is a schematic illustration of a measuring device having a pneumatic arrangement.

FIG. 1 shows a measuring device 10 for measuring the space remaining after a side impact. The measuring device 10 has a pneumatic piston rod cylinder 20 with a cylinder 22 and a piston rod 24 that can move relative to the cylinder 22. A pneumatic arrangement 60 is connected fluidically to the cylinder 22 via a line 62, for example via a hose or via a telescopically extendable metal line. A plate 27 is provided at one end 221 of the cylinder 22, and a plate 28 is provided at one end 261 of the piston rod 24. The plates 27, 28 can also be referred to as adapter plates.

A measuring unit 40 is provided and is designed to measure the movement 26 of the piston rod 24 relative to the cylinder 22. The measuring unit 40 has, for example, a caliper gauge (measuring rod) 41 that is connected to the piston rod 24 and a translation measuring device 42 that is connected to the cylinder 22 for measuring the movement of the caliper gauge 41 and generating a measured value. In one simple embodiment, the translation measuring device 42 can display the movement of the piston rod on a scale, but it can also have an interface (not illustrated) for connecting the translation measuring device 42 to a computing unit.

A display device 43 is provided for displaying a measured value. The display device 43 can be digital or analog. The measuring unit 40 also can comprise a sensor magnet (not illustrated) that is attached to the piston rod 24, and a measuring device may be arranged on the outside of the cylinder 22, for magnetic flux that is generated by the sensor magnet.

The base part 12 is connected to the cylinder 22 via a guide 14 to enable a linear movement of the base part 12 relative to the cylinder 22. Thus, the measuring device 10 can be positioned centrally on a seat, and nevertheless can compensate the travel on the cylinder 22 side.

The base part 12 can be constructed, for example, from a rigid polyurethane or from a foam.

Figure 2:
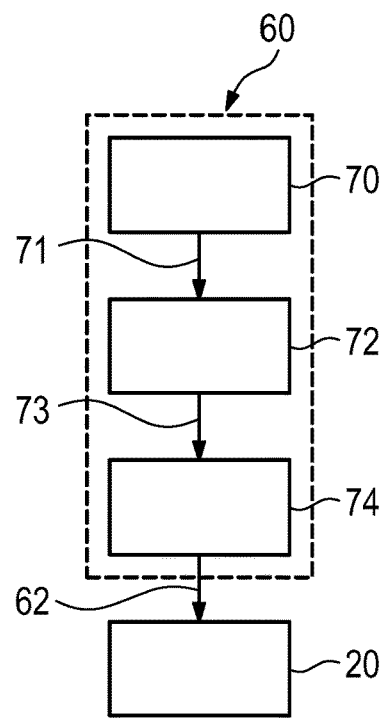
FIG. 2 is a schematic illustration of the pneumatic arrangement from FIG. 1.

FIG. 2 is a schematic view of the design of the pneumatic arrangement 60. A pressure vessel 70 is provided and can be filled, for example, with compressed air or some other gas or gas mixture, such as nitrogen. A connection is provided to fill the pressure vessel 70. A pressure vessel 70 that stores compressed air may be referred to as a compressed air vessel or a compressed air accumulator. The pressure vessel 70 is connected fluidically via a line 71 to a pressure-reduction valve 72 that is designed to limit the pressure P in the piston rod cylinder 20 to a predefined pressure P_s. An adjustable pressure-reduction valve 72 also is referred to as a pressure control valve. The outlet of the pressure-reduction valve 72 is connected fluidically to a controllable valve 74 via a line 73. The valve 74 may have a toggle switch or a handwheel. The valve 74 is connected fluidically to the piston rod cylinder 20 via the line 62. The fluidic connection between the pneumatic arrangement 60 and the piston rod cylinder 20 via the valve 74 is optionally fluid-conducting or non-fluid-conducting.

The sequence in which the valve 74 is provided closer to the piston rod cylinder 20 than the valve 72 can also be interchanged, or a combination valve can be used for permitting both pressure limitation and disconnection of the fluidic connection.

Figure 3:
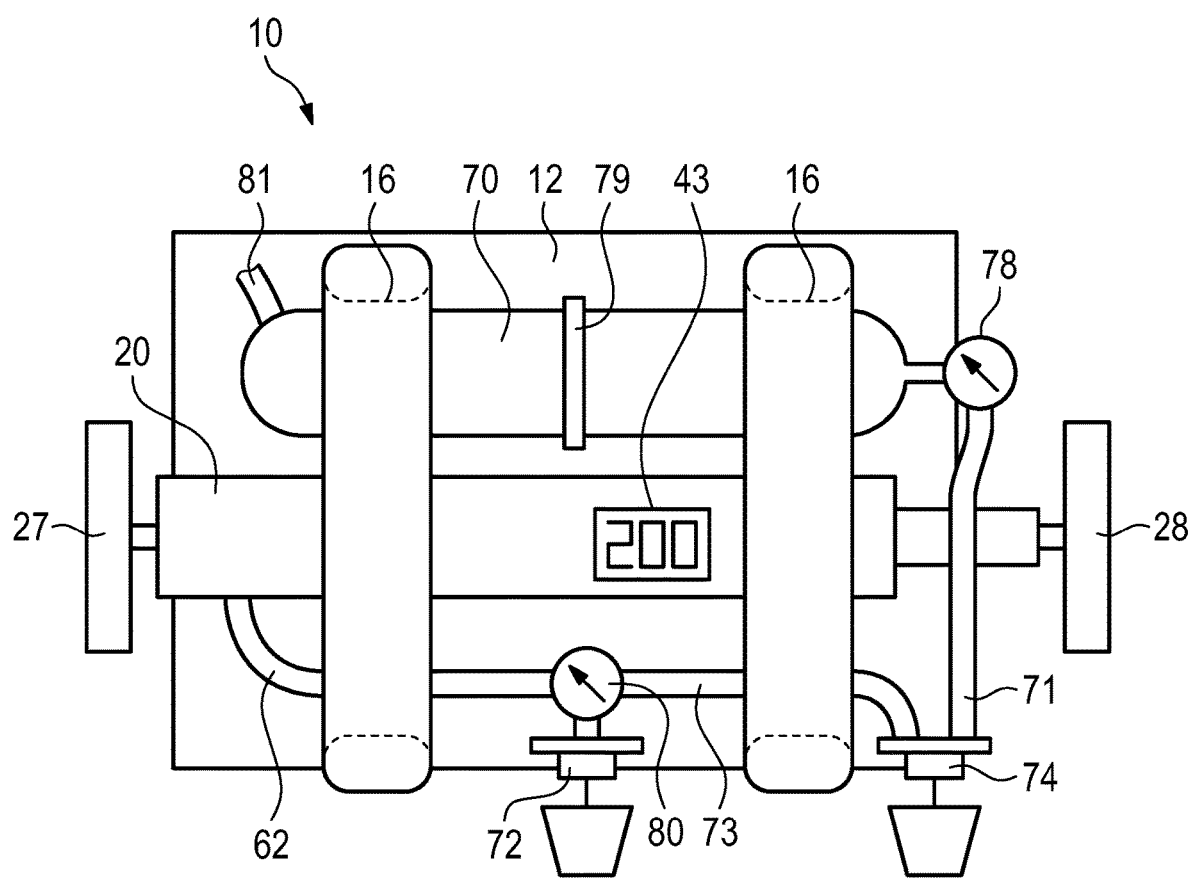
FIG. 3 is a plan view of the measuring device of FIG. 1.

FIG. 3 shows the measuring device 10 in a plan view. The base part 12 is arranged below, and two U-shaped handles 16 are connected to the base part 12 to be able to easily position the measuring device 10. The piston rod cylinder 20 is arranged between the base part 12 and the handles 16, and the plates 27, 28 are connected to the piston rod cylinder 20 via a screw connection (indicated schematically). The display device 43 is a digital display device and displays a measured value.

The pressure vessel 70 is connected to the base part 12 via a detachable connection 79, for example by means of a belt with a touch-and-close fastener or a clamping device. The pressure vessel 70 has a connection 81 via which the fluid under pressure can be topped up. The pressure measuring unit (manometer) 78 is provided at the outlet of the pressure vessel 70 to permit checking of the pressure in the pressure vessel 70. The pressure vessel 70 is connected to the valve 74 via the line 71. As a result, the fluidic connection between the pressure vessel 70 and the piston rod cylinder 20 can be opened or closed from the front. The valve 74 is connected to the pressure-reduction valve 72 via a line 73, and a pressure measuring unit 80 is provided on the pressure-reduction valve 72 to permit checking of the pressure in the piston rod cylinder 20. The pressure-reduction valve 72 is connected to the piston rod cylinder 20 via the line 62 and also is accessible from the front.

An additional outlet valve can be provided on the cylinder 22 to permit the piston rod 24 to slide back after the measuring process, or a controllable connection to the atmosphere can be provided in the region of the line 62, the pressure-reduction valve 72 or the valve 74. A restoring spring can be provided in the cylinder 22 to apply an inward force to the piston rod 24. It is also possible to wait until the pressure in the cylinder 22 has dropped sufficiently after the fluidic disconnection from the pressure vessel 70. A cylinder that can be acted on on both sides can be used and permits a forward stroke and return stroke by corresponding control of the compressed air flow.

Figure 4:
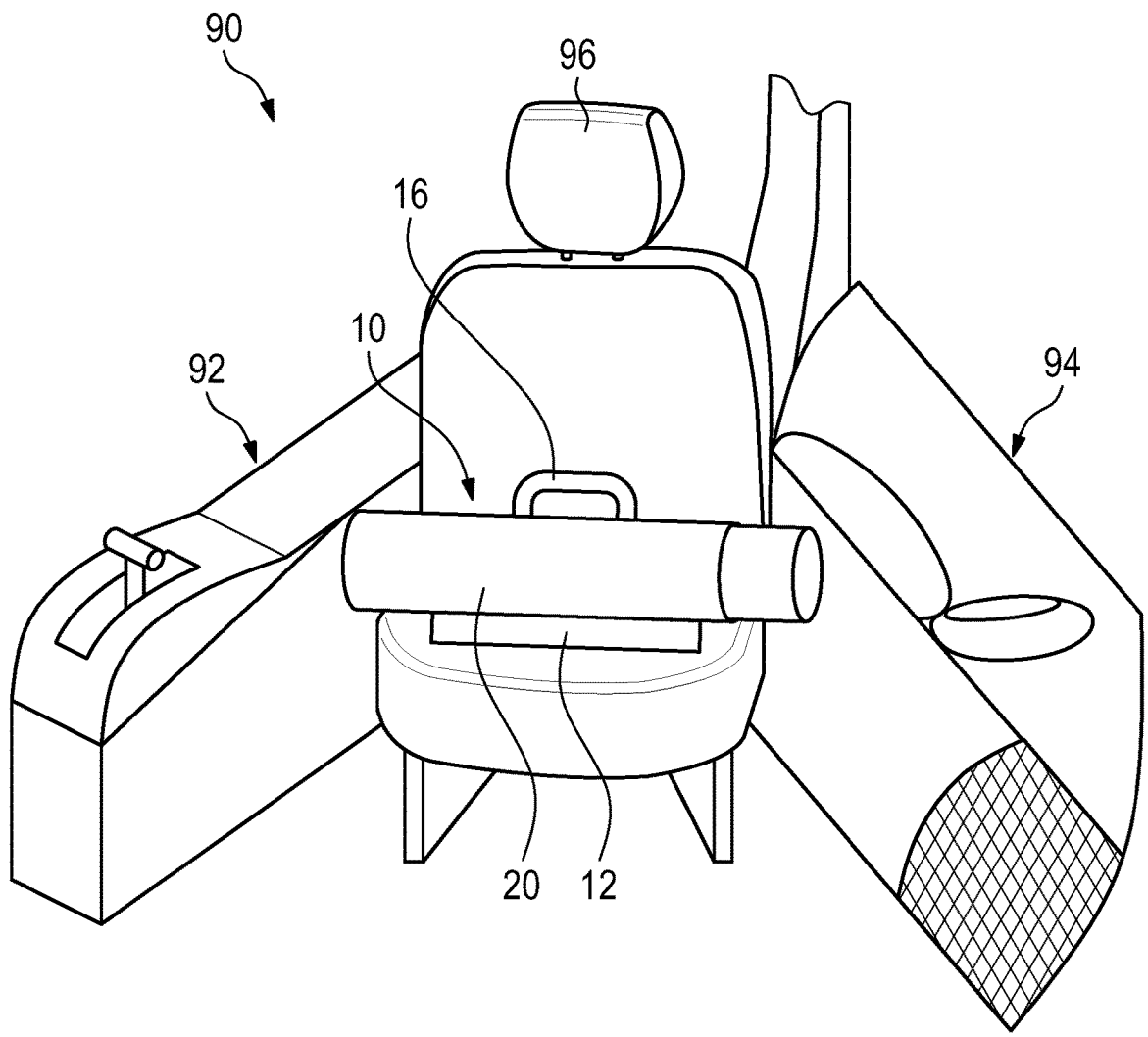
FIG. 4 shows the measuring device of FIG. 1 during a measurement in a vehicle.

FIG. 4 shows the measuring device 10 in a vehicle 90. A vehicle seat 96 is provided, and, for example, the space available to the vehicle occupant is limited on the side of the vehicle occupant by a central console 92, and on the left side by a vehicle door 94. The base part 12 is positioned on the vehicle seat 96, and thus the piston rod cylinder 20 is positioned in an automatically suitable way for the measurement.

Method of Functioning

After a side impact test, a crash test dummy, which is usually present during the test, can be removed from the vehicle seat 96, and the measuring device 10 can be positioned on the vehicle seat 96. The measuring device 10 can be positioned on a seat in the vehicle by positioning the base part 12. The piston rod cylinder 20 preferably is located in the region of the hip of the vehicle occupant. The piston rod cylinder 20 preferably is arranged here essentially at a right angle to the longitudinal axis of the vehicle. However, the orientation depends on the orientation of the vehicle seat 96.

To determine the survival space, the valve 74 is connected in a fluid-conducting fashion, and the pressure vessel 70 is connected fluidically to the piston rod cylinder 20 via the pressure-reduction valve 72. As a result, the piston rod 24 is extended. After a predefined travel distance, the plate 28 enters into contact with part of the vehicle 90, and the cylinder 22 subsequently is moved relative to the base part 12 using the guide 14, until the plate 27 enters into contact with the vehicle 90.

The pressure can be adjusted to a predefined pressure P_s by the pressure control valve 74. As a result, the pressure that is generated by the piston rod cylinder 20 and that acts on the vehicle 90 is predefined. The force that is required for the measurement is applied via the internal pressure of the cylinder and is transmitted via the predefined area of the plates 27, 28. A prescribed measuring diameter can be provided by means of the size of the plates.

The specification of the pressure in the piston rod cylinder 20 leads to a situation in which loose parts of the vehicle that project into the vehicle occupant compartment are pressed out by the piston rod cylinder 20. In this context, biomechanical considerations or assumptions play a role, according to which side parts which press on a vehicle occupant with a force of, for example, less than F_max=500 N do not give rise to any life-threatening injuries. The value F_max can also be selected to be larger or smaller. This measurement makes it possible to determine the actual effective survival space objectively and in an automated fashion, and the measurement is more informative than a measurement in which only the minimum remaining space for the vehicle occupant is determined, for example, by a measuring tape.

By setting a corresponding pressure it is possible, for example, to bring about a situation in which outward movement of the piston rod cylinder 20 stops when a force of 500 N is generated, that is to say when the vehicle parts are pressed to the side with an application of force of 500 N. In this context, the pressure P and the force acting over the surface of the plates 27, 28 are in a fixed relationship with one another.

It has become apparent that with the measurement shown the statistical variation of the measurement results is reduced significantly.

All of the components that are necessary for the measurement, including the pressure vessel 70, can be provided on the measuring device 10. Thus, the measuring device 10 can be used autonomously for the measurement. At least the following components preferably are installed in the measuring device 10: piston rod cylinder 20, pressure vessel 70, measuring unit 40, valve 74, pressure-limitation valve 72 with the pressure measuring unit 80. Alternatively, a connection for a pressure line can be provided, for example at the location of the pressure vessel, and the compressed air or the fluid can be supplied from an external point.

Of course, a variety of modifications and refinements are possible within the scope of the invention.

It is therefore possible, for example as an alternative to the cylinder 22 with a single piston rod 24, to use a cylinder 22 with two piston rods 24, or two piston rod cylinders 20 that act in the opposite direction also can be used. This is, of course, associated with relatively large material expenditure and financial outlay.

What is claimed is:

1. A measuring device for measuring the space remaining after a side crash, the measuring device comprising: a pneumatic piston rod cylinder with a cylinder, and a piston rod that can move relative to the cylinder; a measuring unit for measuring the movement of the piston rod relative to the cylinder; and a base part for positioning the piston rod cylinder, the piston rod cylinder can be connected to a pressure vessel to permit the piston rod to move out when a fluid is applied to the piston rod cylinder.

2. The measuring device of claim 1, further comprising a pressure-reduction valve that is configured to limit the pressure in the piston rod cylinder to a predefined pressure.

3. The measuring device of claim 2, in which the predefined pressure is adjustable.

4. The measuring device of claim 1, further comprising plates with a predefined area provided at each of the ends of the piston rod cylinder.

5. The measuring device of claim 4, wherein the plates are detachably connected to the piston rod cylinder to permit the plates to be exchanged.

6. The measuring device of claim 1, further comprising a controllable valve that is designed to activate or deactivate the admission of the fluid to the piston rod cylinder.

7. The measuring device of claim 1, further comprising a guide that permits a linear movement of the base part relative to the cylinder.

8. The measuring device of claim 1, configured as a portable unit in which the base part, the piston rod cylinder and the pressure-reduction valve are connected to one another.

9. The measuring device of claim 1, further comprising a pressure vessel.

10. The measuring device of claim 1, further comprising a detachable connection provided on the base part to permit the pressure vessel to be connected to the base part.

11. The measuring device of claim 1, further comprising handles on the base part.

* * * * *